(12) United States Patent
Nagarajan et al.

(10) Patent No.: US 11,706,124 B2
(45) Date of Patent: *Jul. 18, 2023

(54) LOW LATENCY FOR NETWORK DEVICES NOT SUPPORTING LLD

(71) Applicant: ARRIS Enterprises LLC, Suwanee, GA (US)

(72) Inventors: Sabarinathan Nagarajan, Karnataka (IN); Lakshmi Arunkumar, Karnataka (IN); Ian G. Wheelock, Cork (IE)

(73) Assignee: ARRIS ENTERPRISES LLC, Suwanee, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/529,708

(22) Filed: Nov. 18, 2021

(65) Prior Publication Data

US 2022/0200890 A1   Jun. 23, 2022

Related U.S. Application Data

(60) Provisional application No. 63/127,240, filed on Dec. 18, 2020.

(51) Int. Cl.
*H04L 45/121* (2022.01)
*H04L 45/12* (2022.01)
(Continued)

(52) U.S. Cl.
CPC .......... *H04L 45/121* (2013.01); *H04L 45/123* (2013.01); *H04L 45/302* (2013.01);
(Continued)

(58) Field of Classification Search
CPC ..... H04L 45/121; H04L 45/123; H04L 45/22; H04L 45/38; H04L 47/24; H04L 47/2483
See application file for complete search history.

(56) References Cited

U.S. PATENT DOCUMENTS 9,929,961 B2 * 3/2018 Luke ................ H04L 45/38
11,050,668 B2 * 6/2021 Luke ................ H04L 45/7453
(Continued)

OTHER PUBLICATIONS

Greg White et al. "Low Latency DOCSIS: Overview and Performance Characteristics", 2019 SCTE ISBE Cable-Tec Expo, New Orleans, La, USA, 27 pages. (Year: 2019).*
(Continued)

*Primary Examiner* — George C Neurauter, Jr.
(74) *Attorney, Agent, or Firm* — Wenderoth, Lind & Ponack, L.L.P.

(57) ABSTRACT

An optimizing agent of a network device that does not support low latency DOCSIS can identify traffic or packets associated with a client resource for an optimization service flow. For example, the optimizing agent can receive a priority notification associated with a client resource from a low latency controller that is indicative of a low latency requirement associated with the client resource. The optimizing agent identifies the traffic for the optimized service flow based on the priority notification. The identifying can require modifying one or more parameters of an existing service flow, creating a new service flow, or selecting an existing service flow with low latency. The identified traffic can be routed to the optimized service flow to achieve low latency or high QoS.

20 Claims, 4 Drawing Sheets

(51) Int. Cl.
  *H04L 45/302* (2022.01)
  *H04L 45/00* (2022.01)
  *H04L 47/2483* (2022.01)
  *H04L 47/24* (2022.01)
(52) U.S. Cl.
  CPC .............. *H04L 45/38* (2013.01); *H04L 47/24* (2013.01); *H04L 47/2483* (2013.01)

(56) References Cited

U.S. PATENT DOCUMENTS

| | | | |
|---|---|---|---|
| 2005/0018651 A1 | 1/2005 | Yan et al. | |
| 2018/0343206 A1* | 11/2018 | White | H04L 47/11 |
| 2020/0053018 A1* | 2/2020 | White | H04L 47/11 |
| 2021/0029049 A1* | 1/2021 | Assouline | H04L 67/61 |

OTHER PUBLICATIONS

International Search Report and the Written Opinion of the International Searching Authority dated Mar. 1, 2022 in International (PCT) Application No. PCT/US2021/059822.

White K Sundaresan B Briscoe Cablelabs G: "Low Latency DOCSIS—Technology Overview; draft-white-tsvwg-lld-00.txt", Low Latency OCSIS—Technology Overview; Draft-White-tsvwg-lld-00 . txt; Internet-Draft: Transport Area Working Group, Internet Engineering Task Force, IETF; Standardworkingdraft, Internet Society (ISO, Mar. 12, 2019 (Mar. 12, 2019), pp. 1-25, XP015132011, Retrieved from the Internet : URL:https://tools.ietf.org/html/draft-white-tsvwg-lld-00 [retrieved on Mar. 12, 2019] Section 2 Latency in DOCSIS Networks; Section 3 New Dual-Queue Approach;; p. 4-p. 12 Section 6 Deployment Considerations; p. 16-p. 18.

"Data-Over-Cable Service Interface Specifications DOCSIS 4.0 MAC and Upper Layer Protocols Interface Specification", ITU-T Draft; Study Period 2017-2020; Study Group 9, International Telecommunication Union, Geneva ; CH Feb. 17, 2020 (Feb. 17, 2020), pp. 1-953, XP044289244, Retrieved from the Internet: URL:https://www.itu.int/ifa/t/2017/sg9/docs/c/ties/T17-SG09-C-0112! !ZIP-E.zip DOCSIS%204.0/CM-SPMULPIv4.0-I01-190815.pdf [retrieved on Feb. 17, 2020] Section 7.5.7 General Operation (Static / dynamic configuration operation);; p. 290-p. 292 Section 7.7 Low Latency Support; p. 298-p. 315 Section 11.2 Dynamic Service Flow Changes (CM initiated / CMTS initiated);; p. 502-p. 534.

* cited by examiner

LOW LATENCY FOR NETWORK DEVICES NOT SUPPORTING LLD

BACKGROUND

Cable service providers, which are also referred to as Multiple System Operators ("MSO"), typically transmit analog and digital video broadcast television signals, as well as broadband data services, to their customers. These broadband data services typically include Internet access using the Data Over Cable Service Interface Specification ("DOCSIS") protocol. The Low Latency DOCSIS (LLD) technology aims to achieve an approximately one millisecond round-trip delay for time sensitive applications, for example, online gaming applications. An aggregate service flow (ASF) is created to establish service flows (SF) in each direction with one flow to carry non-queue binding (NQB) traffic, such as LLD traffic, and another flow to carry queue building (QB) traffic, such as traffic associated with video streaming. However, in a typical MSO environment, there can be a combination of modems some of which that are not LLD capable. A low latency application behind an LLD capable modem experiences a reduced latency when compared with the same application behind a modem that is not LLD capable. Replacing all non-LLD modems with LLD capable modems would be time-consuming in that dedicated personnel resources would be required. Also, such could be unnecessarily expensive given the amount of LLD traffic for a particular network. Thus, there is a need to adapt non-LLD capable modems to modify the existing quality of service (QoS) mechanism to reduce the degradation experience by the user using the low latency application.

SUMMARY

As described herein is a network and method for identifying or routing low latency traffic associated with a client resource, such as a low latency application, in a network environment that includes one or more network devices that do not support low latency, for example, a non-LLD capable access point device. By using the capabilities or functionality provided by a low latency controller and one or more LLD and an LLD capable access point device, low latency traffic can be identified for an appropriate service flow that will provide the required low latency even when the traffic is routed using a non-LLD capable access point device. In this way, the existing network infrastructure can be utilized to identify low latency traffic for an optimized service flow so as to ensure the low latency required by a client resource. A higher level of QoS can be provided without requiring extensive costs or personnel resources.

An aspect of the present disclosure provides a method for an optimizing agent of a network device to provide traffic associated with a client resource for an optimized service flow. The method comprises establishing a connection to a low latency controller, wherein at least one access point device of the network does not support LLD, receiving a prioritization notification associated with the client resource from the low latency controller over one or more existing service flows, wherein the prioritization notification is indicative of a low latency requirement associated with the client resource, and identifying the traffic associated with the client resource for the optimized service flow, wherein identifying the traffic for the optimized service flow comprises one of modifying one or more service flow parameters of the optimized service flow, wherein the optimized service flow is one of the one or more existing service flows, creating a new service flow as the optimized service flow, or selecting a low latency service from the one or more existing service flows on which one or more low latency packets are currently routed as the optimized service flow.

In an aspect of the present disclosure, the method such that the selecting the low latency service flow comprises determining one or more traffic class attributes associated with the low latency service flow, determining a usage factor associated with the low latency service flow, and identifying the low latency service flow based on the traffic class, the usage factor, or both.

In an aspect of the present disclosure, the method such that the new service flow comprises one or more low latency parameters.

In an aspect of the present disclosure, the method further comprising sending a dynamic service addition (DSA) message to a broadband access equipment to create the new service flow, wherein the DSA message comprises the one or more low latency parameters.

In an aspect of the present disclosure, the method such that modifying the one or more service flow parameters comprises sending a dynamic service change (DSC) message to a broadband access equipment.

In an aspect of the present disclosure, the method further comprising determining a cessation of the traffic associated with the client resource and altering the optimized service flow based on the cessation of the traffic associated with the client resource.

In an aspect of the present disclosure, the method such that altering the optimized service flow comprises at least one of reverting the modification of the one or more service flow parameters, deleting the optimized service flow, or ceasing routing of the traffic on the optimized service flow.

An aspect of the present disclosure provides an optimizing agent of a network device in a network for identifying traffic associated with a client resource for an optimized service flow. The network device comprising a memory storing one or more computer-readable instructions of the optimizing agent and a processor configured to execute the one or more computer-readable instructions to establish a connection to a low latency controller, wherein at least one access point device of the network does not support LLD, receive a prioritization notification associated with the client resource from the low latency controller over one or more existing service flows, wherein the prioritization notification is indicative of a low latency requirement associated with the client resource, and identify the traffic associated with the client resource for the optimized service flow, wherein identifying the traffic for the optimized service flow comprises one of modifying one or more service flow parameters of the optimized service flow, wherein the optimized service flow is one of the one or more existing service flows, creating a new service flow as the optimized service flow, or selecting a low latency service flow from the one or more existing service flows on which low latency packets are currently routed as the optimized service flow.

In an aspect of the present disclosure, the processor is configured to execute the one or more computer-readable instructions such that selecting the low latency service flow comprises determining one or more traffic class attributes associated with the low latency service flow, determining a usage factor associated with the low latency service flow, and identifying to the low latency service flow based on the traffic class, the usage factor, or both.

In an aspect of the present disclosure, the new service flow comprises one or more low latency parameters.

In an aspect of the present disclosure, the processor is configured to execute one or more further instructions to send a DSA message to a broadband access equipment to create the new service flow, wherein the DSA message comprises the one or more low latency parameters.

In an aspect of the present disclosure, the processor is configured to execute the one or more computer-readable instructions.

In an aspect of the present disclosure, the processor is configured to execute the one or more computer-readable instructions such that modifying the one or more service flow parameters comprises sending a DSC message to a broadband access equipment.

In an aspect of the present disclosure, the processor is configured to execute the one or more computer-readable instructions to determine a cessation of the traffic associated with the client resource and alter the optimized service flow based on the cessation of the traffic associated with the client resource.

In an aspect of the present disclosure, the processor is configured to execute the one or more computer-readable instructions such that altering the optimized service flow comprises at least one of reverting the modification of the one or more service flow parameters, deleting the optimized service flow, or ceasing routing of the traffic on the optimized service flow.

An aspect of the present disclosure provides a non-transitory computer-readable medium of storing one or more instructions for identifying traffic associated with a client resource for an optimized service flow, which when executed by a processor of a network device of a network, cause the network device to perform one or more operations to perform any one or more of the above method steps.

The above-described network device(s) or electronic apparatus(es), such as access point devices, extender access point devices, client devices and any other network devices, may be implemented as any of a residential network access point device, an electronic device (for example, a mobile phone, a computing device such as a notebook computer, or both) according to one or more embodiments.

Thus, according to various aspects of the present disclosure described herein, it is possible to identify traffic for a specific application and/or a network device for an optimized service flow so as to provide a higher level of QoS such that a user has an enhanced or improved network experience.

BRIEF DESCRIPTION OF DRAWINGS

In the drawings, like reference numbers generally indicate identical, functionally similar, and/or structurally similar elements.

DETAILED DESCRIPTION

The following detailed description is made with reference to the accompanying drawings and is provided to assist in a comprehensive understanding of various example embodiments of the present disclosure. The following description includes various details to assist in that understanding, but these are to be regarded merely as examples and not for the purpose of limiting the present disclosure as defined by the appended claims and their equivalents. The words and phrases used in the following description are merely used to enable a clear and consistent understanding of the present disclosure. In addition, descriptions of well-known structures, functions, and configurations may have been omitted for clarity and conciseness. Those of ordinary skill in the art will recognize that various changes and modifications of the examples described herein can be made without departing from the spirit and scope of the present disclosure.

Figure 1:
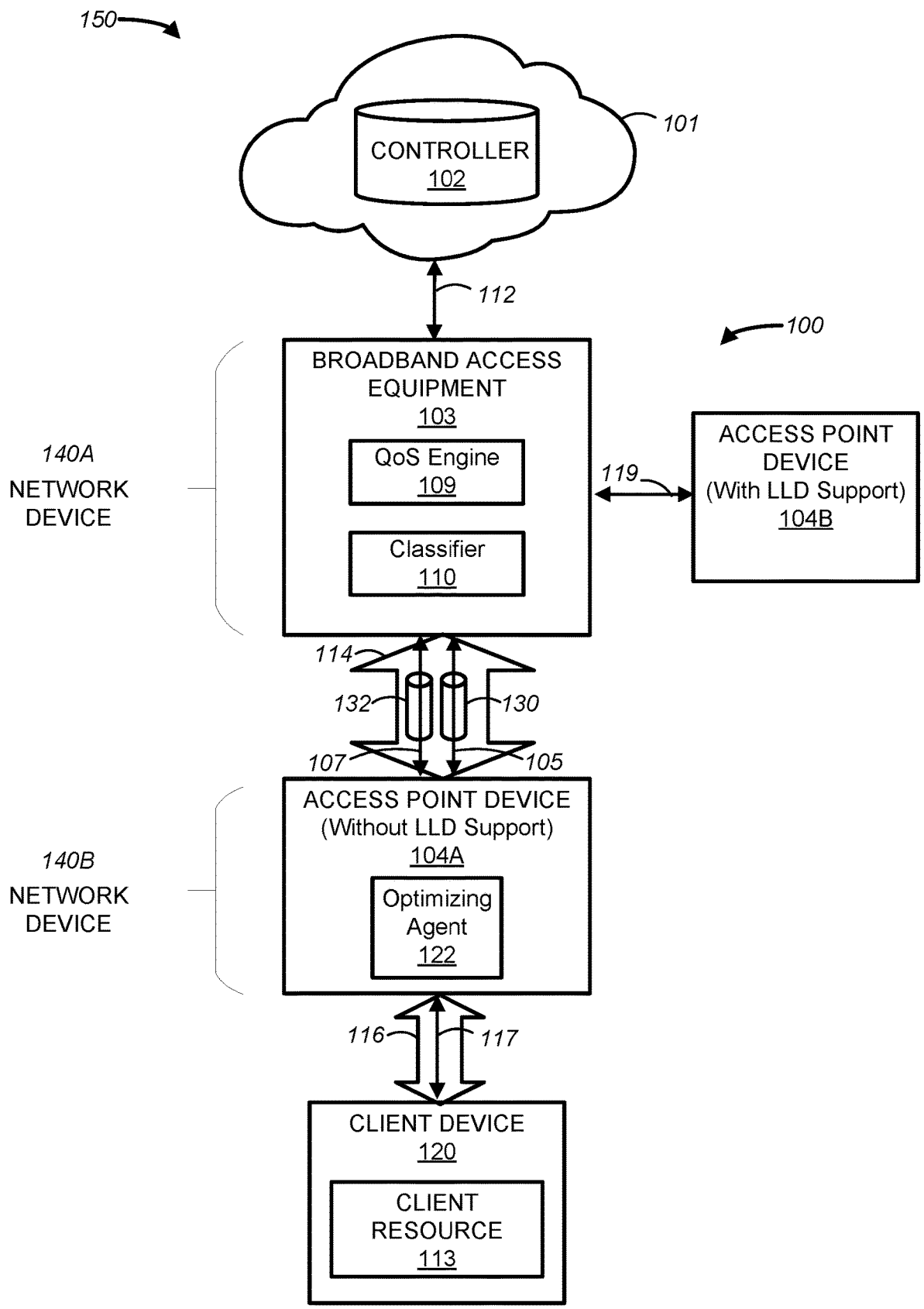
FIG. 1 is an illustration of a network that provides an optimized service flow for low latency traffic, according to one or more aspects of the present disclosure.

Referring now to FIG. 1, the figure illustrates a network environment 150 that provides or identifies in a network 100 low latency traffic 117 associated with a client resource 113, such as an application of a client device 120, for a service flow that provides low latency. The network 100 is connected to a network resource 101 in the network environment 150 via a connection 112. In one or more embodiments, the network 100 can include an Internet Service Provider (ISP). The ISP can comprise any of the broadband access equipment 103, the network resource 101, the low latency controller 102, or any combination thereof.

The network resource 101 can include a low latency controller 102 that provides information associated with one or more requirements for low latency within the network 100, for example, one or more low latency parameters or requirements for traffic 117 associated with a client resource 113. For example, the one or more low latency parameters can comprise any of a maximum sustained traffic rate (such as US TLV [24/70/93].8 or DS TLV [25/71/94].8), a maximum traffic burst (such as [24/25/70/71/93/94].9), a peak traffic rate (such as US TLV [24/70].27 & DS TLV [25/71].27), any other low latency parameter, or a combination thereof. The network resource 101, the low latency controller 102, or both can comprise a representative computer system 200 as discussed with reference to FIG. 2. In one or more embodiments, the network resource 101 can be an Internet cloud resource or a cloud-based service, a cloud-based repository, any other type of cloud or network resource, or any combination thereof. The connection 112 between the network resource 101 and the broadband access equipment 103 can be implemented using a DOCSIS network, an Internet engineering task force (IETF) standards-based network, or any other appropriate network.

In one or more embodiments, the network 100 can comprise one or more network devices 140, for example, network device 140A and network device 140B. The network device 140A can be a broadband access equipment 103. The broadband access equipment 103 can be connected to the network resource 101 via a connection 112. In one or more embodiments, connection 112 can include a Commercial Grade Network Address Translation ("CGNAT") device. Connection 112 provides for transmitting and receiving data to and from the broadband access equipment 103.

In one or more embodiments, the broadband access equipment 103 can be any of a cable modem termination system (CMTS), an optical line terminator (OLT), a broadband network gateway (BNG), a digital subscriber line access multiplexer (DSLAM), or any combination thereof. The broadband access equipment 103 can include a QoS engine 109 and a classifier 110. The QoS engine 109 and classifier 110 can include information relating to the Media Access Control ("MAC") address of an access point device 104; a primary quality of service, such as Pri_SF=1 megabits per second (Mbps); a secondary quality of service, such as Sec_SF=40 Mbps; and can classify the WAN_IP address of an access point device 104. The broadband access equipment 103 can transmit and receive data to and from an access point device 104A via a connection 114 and an access point device 104B via a connection 119. To expose the QoS of the devices in the network 100 to the broadband access equipment 103, classifiers are added to the Sec_SF information, based on the TCP/UDP port range 0-16k, where "k" represents 1024. To provide extra service to the network 100, it may also be desirable to split the network address port translation (NAT) transmission control protocol/user datagram protocol (TCP/UDP) port space using the range 0-16k for specific addresses in the network 100, and using the range 16k to 64k (or 65536) for all other internet protocol (IP) addresses. The assignment of traffic in the network 100 to the NAT TCP/UDP port ranges can be based on multiple traffic classifiers if required. For instance, a simple option is to assign an explicit IP address to use the reserved TCP/UDP port range, thus ensuring that all traffic for a specific device, for example, a client device 120, in the home network would get differentiated QoS. Another approach could be to use specific differentiated services code point (DSCP) markings in packets to use the reserved TCP/UDP port range. Multiple TCP/UDP port ranges could also be identified to enable multiple QoS levels to be supported by the broadband access equipment 103. In terms of being able to classify traffic to identify if a client resource 113 requires higher QoS, then this is preferably achieved through a user interface that is exposed to a user to pick out priorities for different client resources 113. Alternatively, it could be offered through service provider policies, e.g., ensuring World of Warcraft games get a high QoS.

The network 100 can include one or more access point devices 104, for example, an access point device 104A without LLD support and an access point device 104B with LLD support. An access point device 104 can be an electronic device that does not support LLD. For example, the access point device 104A can be configured as a DOCSIS 3.0 device or a DOCSIS 3.1 device running a stack that does not support LLD. While only two access point devices 104 are illustrated, the present disclosure contemplates any number access point devices 104, for example, one or more access point devices 104A without LLD support and one or more access point devices 104B with LLD support. In one or more embodiments, an access point device 104 can be an access point and/or a hardware electronic device that may be a combination modem and gateway that combines the functions of a modem (for example, a cable modem and/or a fiber optic modem), an access point (AP), and/or a router for providing content, data or information received from the broadband access equipment 103 to one or more other electronic devices, for example, client device 120 in the network environment 100 via a connection 116. An access point device 104 may also be referred to as a residential gateway, a home network gateway, or a wireless access point (AP). An access point device 104 can comprise any one or more components of the representative computer system 200 of FIG. 2.

The access point device 104A can comprise an optimizing agent 122 that identifies traffic associated with one or more client resources 113 for an optimized service flow, for example, any of an existing optimized service flow 132, a created optimized service flow 130, a modified existing optimized service flow 132, or any combination thereof. For example, the optimizing agent 122 can identify low latency traffic 107 for the existing optimized service 132 or identify low latency traffic 105 for the created optimized service flow 130. While the optimizing agent 122 is illustrated as part of the access point device 104A (network device 140B), the present disclosure contemplates that the optimizing agent 122 can be part of or included within a network device 140A, a network device 140B, or both. Optimizing agent 122 can comprise hardware, software or a combination thereof.

The access point device 104A can be connected to a client device 120 via a connection 116. The connection 116 between the access point device 104A and the client device 120 can be implemented through a wireless connection that operates in accordance with, but is not limited to, any IEEE 802.11 protocols. Additionally, the connection 114 and/or 119 between the access point device 104A and/or 104B, respectively, and the broadband access equipment 103 can also be implemented through a WAN, a LAN, a VPN, MANs, PANs, WLANs, SANs, a DOCSIS network, a fiber optics network (e.g., FTTH, FTTX, or HFC), a PSDN, a global Telex network, or a 2G, 3G, 4G, 5G, or 6G network, for example. The connection 114 and/or 119 can also be implemented using a wireless connection in accordance with Bluetooth protocols, Bluetooth low energy (BLE), or other short range protocols that operate in accordance with a wireless technology standard for exchanging data over short distances using any licensed or unlicensed band such as the citizens broadband radio service (CBRS) band, 2.4 GHz bands, 5 GHz bands, 6 GHz bands, or 60 GHz bands. In one or more embodiments, the connection 114 and/or 119 can also be a wired Ethernet connection. It is also contemplated by the present disclosure that the access point device 2 can include the function of, but is not limited to, a universal plug and play (UPnP) simple network management protocol (SNMP), an Internet Protocol/Quadrature Amplitude Modulator (IP/QAM) set-top box (STB) or smart media device (SMD) that is capable of decoding audio/video content, and playing over-the-top (OTT) or MSO provided content.

Figure 2:
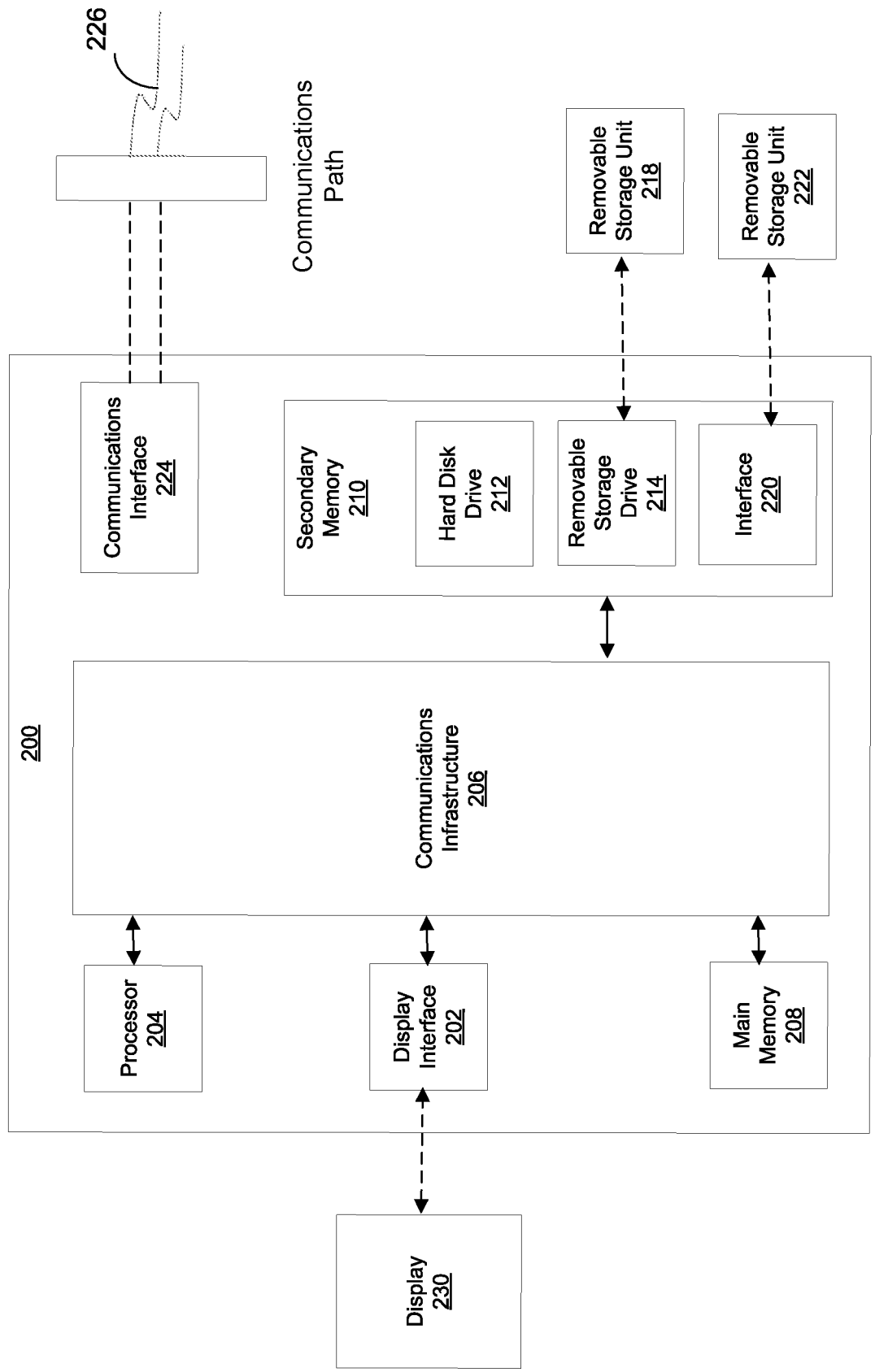
FIG. 2 illustrates a representative computer system in which embodiments of the present disclosure, or portions thereof, may be implemented as computer-readable code, according to one or more aspects of the present disclosure.

Client device 120 can comprise any one or more components of the representative computer system 200 of FIG. 2. Connection 116 can be implemented as discussed above with reference to connection 114. The client device 120 can include a client resource 113. Client resource 113 can be an application, a script, any other executable, an electronic device (such as a computer system 200 or other client device 120), or a combination thereof. While FIG. 1 illustrates a client resource 113 as part of the client device 120, the present disclosure contemplates that the client resource 113 can be part of any other client device 120 or otherwise connected to the client device 120, a network device 140, any other electronic device, or a combination thereof. The access point device 104A can receive traffic 117 associated with a client resource 113 via the connection 116. In one or more embodiments, the client resource 113 can request that traffic 117 be communicated with low latency. In one or more embodiments, one or more settings associated with the client resource 113 can indicate that traffic associated with the client resource 113 should be prioritized or have low latency. In one or more embodiments, the low latency traffic 117 is communicated to the access point device 104A via connection 116 and the access point device 104A identifies the received low latency traffic 117 for an optimized service flow. The optimized service flow can be any of an existing or current service flow 132, a new optimized service flow 130, an existing or current service flow 130 that has been modified, or a combination thereof.

FIG. 2 illustrates a representative computer system 200 in which embodiments of the present disclosure, or portions thereof, may be implemented as computer-readable code or one or more computer-readable instructions. For example, any of the optimizing agent 122, the client device 120, the access point device 104A, the access point device 104B, the broadband access equipment 103, any other electronic or network device of FIG. 1, or any combination thereof may be implemented in whole or in part by a computer system 200 using hardware, software, firmware, non-transitory computer readable media having computer-readable instructions stored thereon, or a combination thereof and may be implemented in one or more computer systems or other processing systems. Hardware, software, or any combination thereof may embody modules and components used to implement the methods and steps of the present disclosure.

If programmable logic is used, such logic may execute on a commercially available processing platform configured by executable software code to become a specific purpose computer or a special purpose device (e.g., programmable logic array, application-specific integrated circuit, etc.). A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 218, a removable storage unit 222, and a hard disk installed in hard disk drive 212.

Various embodiments of the present disclosure are described in terms of this representative computer system 200. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 204 may be a special purpose or a general purpose processor device specifically configured to perform the functions discussed herein. The processor device 204 may be connected to a communications infrastructure 206, such as a bus, message queue, network, multi-core message-passing scheme, etc. The network may be any network suitable for performing the functions as disclosed herein and may include a local area network ("LAN"), a wide area network ("WAN"), a wireless network (e.g., "Wi-Fi"), a mobile communication network, a satellite network, the Internet, fiber optic, coaxial cable, infrared, radio frequency ("RF"), or any combination thereof. Other suitable network types and configurations will be apparent to persons having skill in the relevant art. The computer system 200 may also include a main memory 208 (e.g., random access memory, read-only memory, etc.), and may also include a secondary memory 210. The secondary memory 210 may include the hard disk drive 212 and a removable storage drive 214, such as a floppy disk drive, a magnetic tape drive, an optical disk drive, a flash memory, etc.

The removable storage drive 214 may read from and/or write to the removable storage unit 218 in a well-known manner. The removable storage unit 218 may include a removable storage media that may be read by and written to by the removable storage drive 214. For example, if the removable storage drive 214 is a floppy disk drive or universal serial bus port, the removable storage unit 218 may be a floppy disk or portable flash drive, respectively. In one embodiment, the removable storage unit 218 may be non-transitory computer readable recording media.

In some embodiments, the secondary memory 210 may include alternative means for allowing computer programs or other instructions to be loaded into the computer system 200, for example, the removable storage unit 222 and an interface 220. Examples of such means may include a program cartridge and cartridge interface (e.g., as found in video game systems), a removable memory chip (e.g., EEPROM, PROM, etc.) and associated socket, and other removable storage units 222 and interfaces 220 as will be apparent to persons having skill in the relevant art.

Data stored in the computer system 200 (e.g., in the main memory 208 and/or the secondary memory 210) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SOL) database, a distributed database, an object database, etc. Suitable configurations and storage types will be apparent to persons having skill in the relevant art.

The computer system 200 may also include a communications interface 224. The communications interface 224 may be configured to allow software and data to be transferred between the computer system 200 and external devices. Exemplary communications interfaces 224 may include a modem, a network interface (e.g., an Ethernet card), a communications port, a PCMCIA slot and card, etc. Software and data transferred via the communications interface 224 may be in the form of signals, which may be electronic, electromagnetic, optical, or other signals as will be apparent to persons having skill in the relevant art. The signals may travel via a communications path 226, which may be configured to carry the signals and may be implemented using wire, cable, fiber optics, a phone line, a cellular phone link, a radio frequency link, etc.

The computer system 200 may further include a display interface 202. The display interface 202 may be configured to allow data to be transferred between the computer system 200 and external display 230. Exemplary display interfaces 202 may include high-definition multimedia interface (HDMI), digital visual interface (DVI), video graphics array (VGA), etc. The display 230 may be any suitable type of display for displaying data transmitted via the display interface 202 of the computer system 200, including a cathode ray tube (CRT) display, liquid crystal display (LCD), light-emitting diode (LED) display, capacitive touch display, thin-film transistor (TFT) display, etc.

Computer program medium, computer readable medium, and computer usable medium may refer to memories, such as the main memory 208 and secondary memory 210, which may be memory semiconductors (e.g., DRAMs, etc.). These computer program products may be means for providing software to the computer system 200. Computer programs (e.g., computer control logic) may be stored in the main memory 208 and/or the secondary memory 210. Computer programs may also be received via the communications interface 224. Such computer programs, when executed, may enable computer system 200 to implement the present methods as discussed herein. In particular, the computer programs, when executed, may enable processor device 204 to implement the methods illustrated by FIGS. 1, 3 and 4, as discussed herein. Accordingly, such computer programs may represent controllers of the computer system 200. Where the present disclosure is implemented using software, the software may be stored in a computer program product and loaded into the computer system 200 using the removable storage drive 214, interface 220, and hard disk drive 212, or communications interface 224.

The processor device 204 may comprise one or more modules or engines configured to perform the functions of the computer system 200. Each of the modules or engines may be implemented using hardware and, in some instances, may also utilize software, such as corresponding to program code and/or programs stored in the main memory 208 or secondary memory 210. In such instances, program code may be compiled by the processor device 204 (e.g., by a compiling module or engine) prior to execution by the hardware of the computer system 200. For example, the program code may be source code written in a programming language that is translated into a lower level language, such as assembly language or machine code, for execution by the processor device 204 and/or any additional hardware components of the computer system 200. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 200 to perform the functions disclosed herein. It will be apparent to persons having skill in the relevant art that such processes result in the computer system 200 being a specially configured computer system 200 uniquely programmed to perform the functions discussed above.

Figure 3:
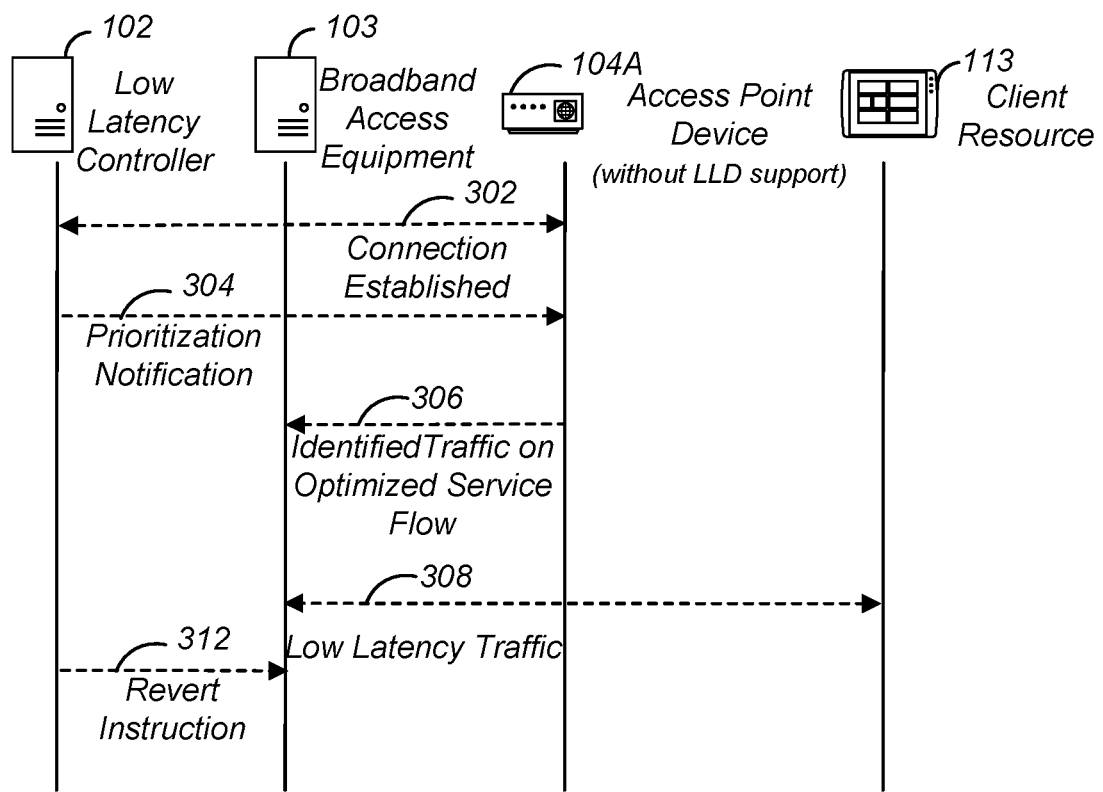
FIG. 3 is a diagram illustrating low latency traffic in a network environment, according to one or more aspects of the present disclosure.

FIG. 3 is a diagram illustrating low latency traffic in a network environment 150, according to one or more aspects of the present disclosure. In one or more embodiments, a network device 140, such as any of an access point device 104A, any other network device 140, any one or more client devices 120, or any combination thereof, can communicate with the low latency controller 102 to receive information about one or more client resources 113 that require low latency to ensure that the user of the client resource 113 has an expected or enhanced experience. The low latency controller 102 of the network resource 101 can establish a connection 302 via a broadband access equipment 103 with an access point device 104A that does not support LLD. The low latency controller 102 can receive from one or more network devices 140, for example, a LLD capable access point device 104B, a broadband access equipment 103, any other LLD capable network device, or a combination thereof, information or data corresponding to or associated with one or more client resources 113 via the connection 302. In one or more embodiments, a LLD capable modem 104B pushes the information or data to the low latency controller 102. The information or data can be indicative of one or more optimization settings of the traffic associated with the one or more client resources 113. For example, information or data can indicate that traffic associated with a client resource 113 should be identified as low latency traffic. For example, a DSX (dynamic service addition/change/deletion) message can be sent from the access point device 104 to the broadband access equipment 103 and/or from the broadband access equipment 103 to the access point device 104. The DSX message can include one or more low latency tag, length and value (TLV) parameters to create/modify/delete the associated low latency service flow. The low latency controller 102 can use the information or data to determine the one or more client resources 113 that require a low latency service flow for associated traffic, for example, that the associated traffic should be identified for an optimized service flow.

The low latency controller 102 can receive a request from a network device 140, such as access point device 104A, for the one or more client resources 113 that should receive prioritization or that should be identified for an optimized service flow. The low latency controller 102 can send a prioritization notification 304 to an optimizing agent 122 of a network device 140, for example, the access point device 104A. In one or more embodiments, the low latency controller 102 can push or send the prioritization notification 304 to an optimizing agent 122 of the network device 140A periodically, at timed intervals, based on detection or determination that certain client resources 113 require prioritization, any other basis, or any combination thereof. The prioritization notification 304 can be indicative of a low latency requirement associated with the client resource 113 such that the traffic of the client resource 113 is prioritized. For example, the prioritization notification 304 can comprise any of the one or more optimization settings of the traffic associated with the one or more client resources 113, one or more identifiers associated with the traffic, one or more identifiers associated with the one or more client resources 113 so as to indicate that the traffic associated with the one or more client resources 113 should be treated as low latency traffic, any other field or value, or a combination thereof. The one or more optimization settings can include a priority level, an identifier, a duration, a time/date, any other setting, or a combination thereof. The priority level can be any value, for example, a value indicative of a QoS level. The identifier can be a unique identifier associated with a particular client application, network device, or both. The identifier can be associated with a group of client applications, network devices, or any combination thereof. A duration can indicate a length of time that the priority level is applied to traffic associated with the selection. The time/date can indicate a day of week, time of day or both that the priority level is applied to traffic associated with the selection.

In one or more embodiments, the traffic associated with the client resource 113 is directed or put on to the optimized service flow based on the one or more optimization settings. For example, the source port (sport) gets remapped to a different source port (nport). In one or more embodiments, specific DSCP markings of the traffic associated with the client resource 113 are set based on the one or more optimizations settings. In one or more embodiments, the one or more optimization settings can include a protocol, a source IP address, a source port, a destination IP address, and a destination port associated with the client resource 113. An LLD capable access point device 104B can push the one or more optimization settings to a controller 102 (for example, an LLD controller). The controller 102 can push the one or more optimization settings to the access point device 104A that does not include LLD support. The access point device 104A can use the one or more optimization settings to prioritize traffic from the client resource 113, for example, identify traffic associated with the client resource 113 for an optimized service flow.

An optimizing agent 122 of the network device 140 can receive the prioritization notification 304 from the low latency controller 102. For example, an optimizing agent 122 of the access point device 104A can receive the prioritization notification 304 from the low latency controller 102 via the broadband access equipment 103. The optimizing agent 122 can identify traffic 306 associated with a client resource 113 for an optimized service flow based on the prioritization notification 304. For example, the optimizing agent 122 of the access point device 104A can identify traffic associated with the client resource 113. Once identified, the low latency traffic 308 can then be put on the appropriate optimized service flow for communication to and/or from the broadband access equipment 103. The low latency controller 102 can send a revert instruction 312 to a network device, such as the broadband access equipment 103, to revert one or more settings associated with the client resource 113 so that the traffic associated with the client resource 113 is no longer identified for an optimized service flow or given an elevated priority.

In one or more embodiments, the identifying by the optimizing agent 122 can comprise creating an optimized service flow 105, modifying one or more service flow parameters of an existing service flow of one or more existing service flows 107 so that traffic or packets are sent with low latency, or selecting a low latency service flow from the one or more existing service flows 107 on which low latency packets are currently routed. In one or more embodiments, creating the optimized service flow can include the optimizing agent 122 creating a service flow, for example, a lightly loaded service flow with a high priority that achieves a minimum round-trip delay (Tmin). The traffic or packets on this created optimized service flow are sent with or experience a minimum latency. For example, a dynamic service addition (DSA) message, that comprises one or more low latency parameters of the to be created or new optimized service flow, can be sent from the access point device 104A to the broadband access equipment 103 (for example, a cable modem termination system (CMTS)) so as to add this new service flow. This newly created optimized service flow can be deleted or removed based on the one or more optimization settings associated with a client resource 113, a subsequent prioritization notification 304 that indicates that the client resource 113 no longer requires low latency, when the client resource 113 is closed or otherwise not utilized, or any combination thereof. In one or more embodiments, the optimizing agent 122 can send a dynamic service delete (DSD) message to the broadband access equipment 103 to delete the service flow selected as the optimized service flow.

In one or more embodiments, modifying the one or more service flow parameters of an existing service flow of the one or more existing service flows 107 so that the traffic or packets associated with a client resource 113 are sent with low latency can be based on the one or more optimization settings associated with the client resource 113. Modifying the one or more service flow parameters can be based on one or more TLV parameters received in a DSX message. The one or more service flow parameters can include any of a traffic class, an admitted QoS parameter, an active QoS parameter, any other service flow parameter, or any combination thereof. For example, the one or more optimization settings can indicate a prioritization or a low latency for the traffic associated with the client resource 113 such that the access point device 104A sends a dynamic service change (DSC) message to broadband access equipment 103 to modify one or more service flow parameters associated with the existing service flow so as to indicate low latency. For example, the DSC message can change the admitted and active QoS parameters of the service flow such that traffic identified for the service flow experiences low latency. The upstream service flow, the downstream service flow, or both can be modified by the DSC message as provided by DOCSIS. In this way, the existing service flow is repurposed dynamically to route low latency traffic or packets associated with the client resource 113. The duration of the repurposing can be based on the one or more optimization settings. Once the duration has been met, the one or more service flow parameters associated with the existing service flow can be reverted back to the previous values, default values, or any other settings. In one or more embodiments, the low latency controller 102 can receive information or data that indicates that the traffic associated with a client resource 113 no longer requires low latency or a prioritization. The low latency controller 102 can send a revert instruction 312 to the broadband access equipment 103 to revert one or more settings associated with the client resource 113 so that associated traffic is no longer identified for an optimized service flow or given a higher priority such that the associated traffic is no longer designated as low latency. In one or more embodiments, the reversion can occur based on the one or more optimization settings, a subsequent prioritization notification 304 that indicates that the network resource 113 no longer requires low latency, when the network resource 113 is closed or otherwise not utilized, or any combination thereof. In one or more embodiments, the optimizing agent 122 can send a dynamic service delete (DSD) message to the broadband access equipment 103 to delete the service flow selected as the optimized service flow.

In one or more embodiments, selecting a low latency service flow from the one or more existing service flows 107 on which low latency packets are currently routed can include identifying one or more traffic class attributes associated with one or more existing service flows and one or more service flows of the one or more existing service flows on which low latency packets are currently routed. The optimizing agent 122 can determine or select a service flow of the one or more existing service flows that is associated with a higher QoS or low latency based on one or more low latency parameters, such as traffic class attributes, a usage factor (such as available bandwidth, usage percentage, or both), or both, and identify the traffic or packets associated with the client resource 113 for the selected low latency service flow. For example, the National Broadband Network (NBN) in Australia has identified at least three traffic class attributes including traffic class 1 (TC1) associated with voice traffic, traffic class 2 (TC2) associated with video traffic, and traffic class 4 associated with a best effort transmission of traffic. Data or traffic associated with TC1 and/or TC2 are given a high priority. The optimizing agent 122 can determine one or more traffic class attributes associated with a service flow that provides low latency. The low latency service flow can be selected or identified based on the one or more traffic class attributes. The identified traffic can be routed as TC1 and/or TC2 as the optimized service flow so that the identified traffic will be given high priority. For a passive optical network (PON), a configuration file can be modified to indicate a low latency service flow for selection as the optimized service flow. The routing of the traffic or packets associated with the client resource 113 on the selected service flow can be stopped such that the traffic or packets are no longer given a priority based on the one or more optimization settings, a subsequent prioritization notification 304 that indicates that the network resource 113 no longer requires low latency, when the network resource 113 is closed or otherwise not utilized, or any combination thereof.

By receiving information or data from any of one or more access point devices 104B that do support LLD or are LLD capable, a broadband access equipment 103, any other network device 140, or a combination thereof, a low latency controller 102 can leverage this information or data so that an access point device 104A without LLD support can identify traffic for an optimized service flow so as to enhance QoS for one or more client resources 113 that require low latency to provide an enhanced network experience for a user. By identifying traffic or packets associated with a client resource 113 for an optimized service flow, latency improvements can be seen by the access point device 104A without LLD support.

Figure 4:
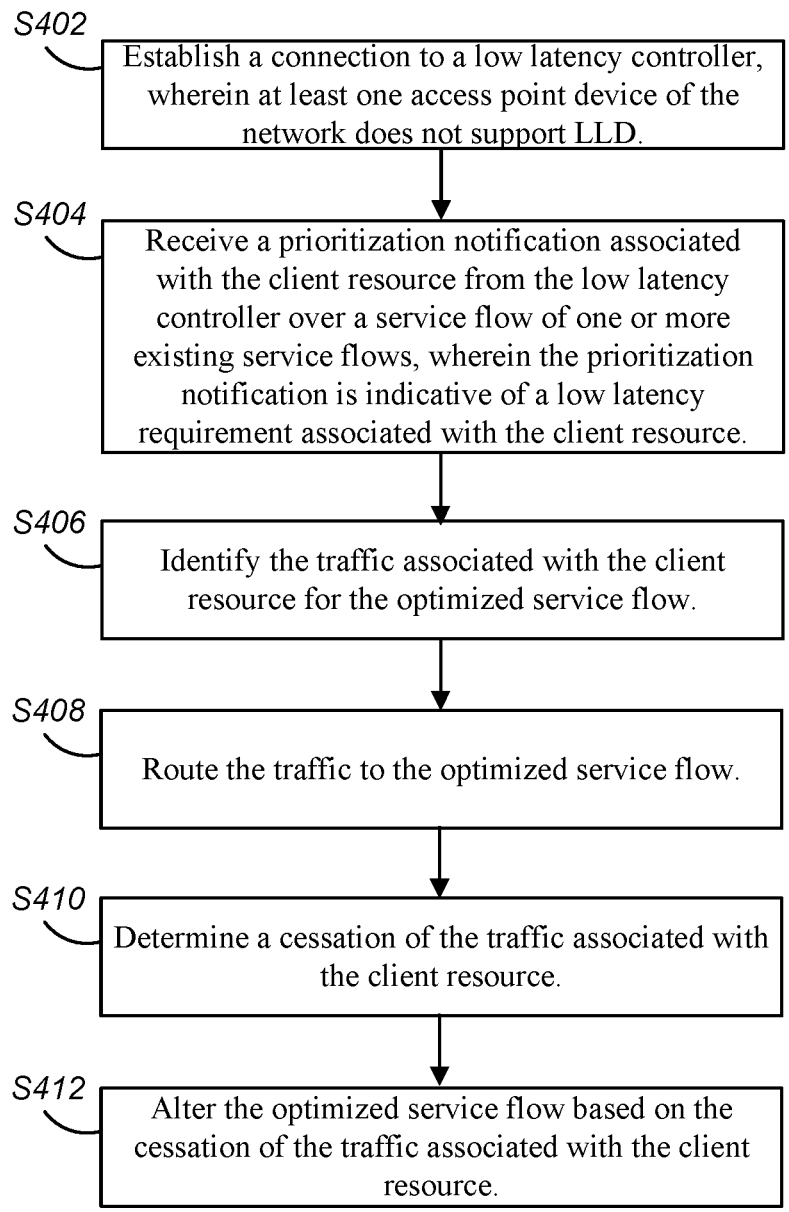
FIG. 4 is a flow diagram for an optimizing agent of an access point device to provide traffic associated with a client resource on an optimized service flow, according to one or more aspects of the present disclosure.

FIG. 4 is a flow diagram for an optimizing agent 122 of network device 140, for example, an access point device 104A or a broadband access equipment 103, to identify traffic associated with a client resource 113 for an optimized service flow such that the traffic is routed to the optimized service flow to achieve the low latency required by the client resource 113, according to one or more aspects of the present disclosure. The optimizing agent 122, the access point device 104A, the broadband access equipment 103, the client device 120, or any other network device or electronic device may be programmed with one or more computer-readable instructions that when executed by a controller or processor cause one or more operations according to FIG. 4. In FIG. 4, it is assumed that any one or more of the devices include their respective controllers and their respective software, for example, optimizing agent 122, stored in their respective memories, as discussed above in connection with any of FIGS. 1-3, which when executed by their respective controllers perform the functions and operations in accordance with the example embodiments of the present disclosure (e.g., including performing a configuration of one or more network devices). While the steps S402-S412 are presented in a certain order, the present disclosure contemplates that any one or more steps can be performed simultaneously, substantially simultaneously, repeatedly, in any order or not at all (omitted).

At S402, the optimizing agent 122 of a network device 140 of a network 100 establishes a connection to a low latency controller 102, for example, of a network resource 101. The network 100 can include any one or more access point devices 104A at least one of which is an access point device 104A that does not include LLD support or have LLD capability. An existing QoS mechanism of an access point device 104A without LLD support can be modified to reduce the degradation experienced by a user using the low latency client resource 113. The connection established between the network device 140 and the low latency controller 102 provides information about the one or more client resources 113 that need or require low latency.

At step S404, the optimizing agent 122 receives a prioritization notification 304 associated with the client resource 113 from the low latency controller 102 over one or more existing service flows. The prioritization notification 304 can include one or more optimization settings indicative of a low latency requirement associated with the client resource 113. For example, the prioritization notification 304 can include an identifier associated with the client resource 113 that requires low latency and an associated low latency or QoS level.

At step S406, the optimizing agent 122 identifies the traffic associated with the client resource 113 for the optimized service flow. This optimized service flow can be an existing service flow or a new service flow. The optimizing agent 122 can, for example, identify the traffic for the optimized service flow by one or more processes. In a first process, a low latency service flow from the one or more existing service flows on which one or more low latency packets are currently routed is selected as the optimized service flow. The low latency service flow can be selected by determining one or more traffic class attributes associated with the low latency service flow, determining a usage factor associated with the low latency service flow, and identifying the low latency service flow based on the traffic class, the usage factor or both.

In a second process, a service flow of the one or more existing service flows is selected as the optimized service flow and one or more service flow parameters of the optimized service flow are modified to achieve low latency or the required QoS level. For example, the access point device 104A that includes the optimizing agent 122 that modifies the one or more service flow parameters, for example, by sending a DSC message to a broadband access equipment 103.

In a third process, a new service flow is created as the optimized service flow. This new service flow can be created to comprise one or more low latency parameters indicative of the low latency required or needed by the client resource 113. For example, the access point device 104A can include an optimizing agent 122 that sends a DSA message to a broadband access equipment 103 to create the new service flow. This DSA message can comprise the one or more low latency parameters.

In one or more embodiments, the optimizing agent 122 uses the first process to look for an existing low latency service flow that is not loaded and if found uses that existing low latency service flow as the optimized service flow. If no existing low latency service flow is found, the optimizing agent 122 can use the second process to determine if an existing service flow can be modified for low latency configuration as the optimized service flow. If not, the optimizing agent 122 can use the third process to create a low latency service flow as the optimized service flow.

At step S408, the optimizing agent 122 can route the traffic to the optimized service flow so that the traffic experiences a low latency or the required QoS level. At step S410, the optimizing agent 122 can determine a cessation of the traffic associated with the client resource 113. For example, the cessation of the traffic can be associated with any of an application that is closed or otherwise suspended, a client device 120 that is disconnected, powered off or otherwise loses connectivity to the network 100, one or more environmental parameters sensed or monitored by a client device 120, an expiration of a time period, a comparison of data, for example one or more environmental parameters, to a threshold, any other cessation, or any combination thereof.

At step S412, the optimizing agent 122 can alter the optimized service flow based on the cessation of the traffic associated with the client resource 113. The optimizing agent 122 can alter the optimized service flow by at least one of reverting the modification of the one or more service flow parameters, for example, back to a default or previous setting, deleting the optimized service flow, for example, by using a DSD message, or ceasing routing of the traffic on the optimized service flow, for example, by identifying the traffic for a service flow of the one or more existing service flows that is not optimized or not identified as a low latency service flow.

Techniques consistent with the present disclosure provide, among other features, systems and methods for a network environment that includes a low latency controller to provide a prioritization notification to an access point device without LLD support so that traffic associated with a client resource can be identified for an optimized service flow which improves the QoS low latency prioritization for the identified traffic. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

Each of the elements of the present invention may be configured by implementing dedicated hardware or a software program on a memory controlling a processor to perform the functions of any of the components or combinations thereof. Any of the components may be implemented as a CPU or other processor reading and executing a software program from a recording medium such as a hard disk or a semiconductor memory, for example. The processes disclosed above constitute examples of algorithms that can be affected by software, applications (apps, or mobile apps), or computer programs. The software, applications, computer programs or algorithms can be stored on a non-transitory computer-readable medium for instructing a computer, such as a processor in an electronic apparatus, to execute the methods or algorithms described herein and shown in the drawing figures. The software and computer programs, which can also be referred to as programs, applications, components, or code, include machine instructions for a programmable processor, and can be implemented in a high-level procedural language, an object-oriented programming language, a functional programming language, a logical programming language, or an assembly language or machine language.

The term "non-transitory computer-readable medium" refers to any computer program product, apparatus or device, such as a magnetic disk, optical disk, solid-state storage device (SSD), memory, and programmable logic devices (PLDs), used to provide machine instructions or data to a programmable data processor, including a computer-readable medium that receives machine instructions as a computer-readable signal. By way of example, a computer-readable medium can comprise DRAM, RAM, ROM, EEPROM, CD-ROM or other optical disk storage, magnetic disk storage or other magnetic storage devices, or any other medium that can be used to carry or store desired computer-readable program code in the form of instructions or data structures and that can be accessed by a general-purpose or special-purpose computer, or a general-purpose or special-purpose processor. Disk or disc, as used herein, includes compact disc (CD), laser disc, optical disc, digital versatile disc (DVD), floppy disk and Blu-ray disc. Combinations of the above are also included within the scope of computer-readable media.

The word "comprise" or a derivative thereof, when used in a claim, is used in a nonexclusive sense that is not intended to exclude the presence of other elements or steps in a claimed structure or method. As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise. Use of the phrases "capable of," "configured to," or "operable to" in one or more embodiments refers to some apparatus, logic, hardware, and/or element designed in such a way to enable use thereof in a specified manner.

While the principles of the inventive concepts have been described above in connection with specific devices, apparatuses, systems, algorithms, programs and/or methods, it is to be clearly understood that this description is made only by way of example and not as limitation. The above description illustrates various example embodiments along with examples of how aspects of particular embodiments may be implemented and are presented to illustrate the flexibility and advantages of particular embodiments as defined by the following claims, and should not be deemed to be the only embodiments. One of ordinary skill in the art will appreciate that based on the above disclosure and the following claims, other arrangements, embodiments, implementations and equivalents may be employed without departing from the scope hereof as defined by the claims. It is contemplated that the implementation of the components and functions of the present disclosure can be done with any newly arising technology that may replace any of the above-implemented technologies. Accordingly, the specification and figures are to be regarded in an illustrative rather than a restrictive sense, and all such modifications are intended to be included within the scope of the present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

What we claim is:

1. A method for an optimizing agent of a network device in a network, the method comprising:
   establishing a connection to a low latency controller, wherein at least one access point device of the network does not support low latency data over cable service interface specification (LLD);
   receiving a prioritization notification associated with a client resource from the low latency controller over one or more existing service flows, wherein the prioritization notification is indicative of a low latency requirement associated with the client resource; and
   identifying traffic associated with the client resource for an optimized service flow, wherein the optimized service flow is a service flow that provides low latency as required by the client resource, and wherein identifying the traffic for the optimized service flow comprises one of:

modifying one or more service flow parameters of the optimized service flow, wherein the optimized service flow is one of the one or more existing service flows;

creating a new service flow as the optimized service flow; or selecting a low latency service flow from the one or more existing service flows on which one or more low latency packets are currently routed as the optimized service flow.

2. The method of claim 1, wherein when the identifying the traffic for the optimized service flow comprises selecting the low latency service flow from the one or more existing service flows on which one or more low latency packets are currently routed as the optimized service flow, the selecting the low latency service flow comprises:

determining one or more traffic class attributes associated with the low latency service flow;

determining a usage factor associated with the low latency service flow; and identifying the low latency service flow based on the traffic class, the usage factor, or both.

3. The method of claim 1, wherein when the identifying the traffic for the optimized service flow comprises creating the new service flow as the optimized service flow, the new service flow comprises one or more low latency parameters.

4. The method of claim 3, further comprising:

sending a dynamic service addition (DSA) message to a broadband access equipment to create the new service flow, wherein the DSA message comprises the one or more low latency parameters.

5. The method of claim 1, wherein when the identifying the traffic for the optimized service flow comprises modifying one or more service flow parameters of the optimized service flow, the modifying the one or more service flow parameters comprises sending a dynamic service change (DSC) message to a broadband access equipment.

6. The method of claim 1, further comprising:

determining a cessation of the traffic associated with the client resource; and altering the optimized service flow based on the cessation of the traffic associated with the client resource.

7. The method of claim 6, wherein altering the optimized service flow comprises at least one of:

reverting the modification of the one or more service flow parameters;

deleting the optimized service flow; or ceasing routing of the traffic on the optimized service flow.

8. A network device in a network, the network device comprising:

a memory storing one or more computer-readable instructions of an optimizing agent of the network device; and a processor configured to execute the one or more computer-readable instructions to:

establish a connection to a low latency controller, wherein at least one access point device of the network does not support low latency data over cable service interface specification (LLD);

receive a prioritization notification associated with a client resource from the low latency controller over one or more existing service flows, wherein the prioritization notification is indicative of a low latency requirement associated with the client resource; and identify traffic associated with the client resource for an optimized service flow, wherein the optimized service flow is a service flow that provides low latency as required by the client resource, and wherein identifying the traffic for the optimized service flow comprises one of:

modifying one or more service flow parameters of the optimized service flow, wherein the optimized service flow is one of the one or more existing service flows;

creating a new service flow as the optimized service flow; or selecting a low latency service flow from the one or more existing service flows on which low latency packets are currently routed as the optimized service flow.

9. The network device of claim 8, wherein when the identifying the traffic for the optimized service flow comprises selecting the low latency service flow from the one or more existing service flows on which one or more low latency packets are currently routed as the optimized service flow, the selecting the low latency service flow comprises:

determining one or more traffic class attributes associated with the low latency service flow;

determining a usage factor associated with the low latency service flow; and identifying the low latency service flow based on the traffic class, the usage factor, or both.

10. The network device of claim 8, wherein when the identifying the traffic for the optimized service flow comprises creating the new service flow as the optimized service flow, the new service flow comprises one or more low latency parameters.

11. The network device of claim 10, wherein the processor is configured to execute one or more further instructions to:

send a dynamic service addition (DSA) message to a broadband access equipment to create the new service flow, wherein the DSA message comprises the one or more low latency parameters.

12. The network device of claim 8, wherein when the identifying the traffic for the optimized service flow comprises modifying one or more service flow parameters of the optimized service flow, the modifying the one or more service flow parameters comprises sending a dynamic service change (DSC) message to a broadband access equipment.

13. The network device of claim 8, wherein the processor is configured to execute one or more further instructions to:

determine a cessation of the traffic associated with the client resource; and alter the optimized service flow based on the cessation of the traffic associated with the client resource.

14. The network device of claim 13, wherein altering the optimized service flow comprises at least one of:

reverting the modification of the one or more service flow parameters;

deleting the optimized service flow; or ceasing routing of the traffic on the optimized service flow.

15. A non-transitory computer-readable medium storing one or more instructions, which when executed by a processor of a network device of a network, cause the network device to perform one or more operations to:

establish a connection to a low latency controller, wherein at least one access point device of the network does not support low latency data over cable service interface specification (LLD);

receive a prioritization notification associated with a client resource from the low latency controller over one or more existing service flows, wherein the prioritization notification is indicative of a low latency requirement associated with the client resource; and identify traffic associated with the client resource for an optimized service flow, wherein the optimized service flow is a service flow that provides low latency as required by the client resource, and wherein identifying the traffic on the optimized service flow comprises one of:

modifying one or more service flow parameters of the optimized service flow, wherein the optimized service flow is one of one or more existing service flows;

creating a new service flow as the optimized service flow; or selecting a low latency service flow from the one or more existing service flows on which low latency packets are currently routed as the optimized service flow.

16. The non-transitory computer-readable medium of claim 15, wherein when the identifying the traffic for the optimized service flow comprises selecting the low latency service flow from the one or more existing service flows on which one or more low latency packets are currently routed as the optimized service flow, the selecting the low latency service flow comprises:

determining one or more traffic class attributes associated with the low latency service flow;

determining a usage factor associated with the low latency service flow; and identifying the low latency service flow based on the traffic class, the usage factor, or both.

17. The non-transitory computer-readable medium of claim 15, wherein when the identifying the traffic for the optimized service flow comprises creating the new service flow as the optimized service flow, the new service flow comprises one or more low latency parameters.

18. The non-transitory computer-readable medium of claim 17, wherein the one or more instructions when further executed by the processor cause the access point device to further perform the one or more operations to:

send a dynamic service addition (DSA) message to a broadband access equipment to create the new service flow, wherein the DSA message comprises the one or more low latency parameters.

19. The non-transitory computer-readable medium of claim 15, wherein the one or more instructions when further executed by the processor cause the access point device to further perform the one or more operations to:

determine a cessation of the traffic associated with the client resource; and alter the optimized service flow based on the cessation of the traffic associated with the client resource.

20. The non-transitory computer-readable medium of claim 19, wherein altering the optimized service flow comprises at least one of:

reverting the modification of the one or more service flow parameters;

deleting the optimized service flow; or ceasing routing of the traffic on the optimized service flow.

\* \* \* \* \*